United States Patent [19]
Bohman

[11] 3,715,577
[45] Feb. 6, 1973

[54] UNDERWATER LOCALIZATION SYSTEM

[75] Inventor: Carl E. Bohman, Sudbury, Mass.
[73] Assignee: Sperry Rand Corporation
[22] Filed: Feb. 8, 1971
[21] Appl. No.: 113,184

[52] U.S. Cl. .................................................340/6 R
[51] Int. Cl. ..............................................G01s 3/00
[58] Field of Search ......................340/5 T, 6 R, 16 P

[56] References Cited

UNITED STATES PATENTS

| | | | |
|---|---|---|---|
| 3,445,806 | 5/1969 | Band | 340/6 R |
| 3,021,481 | 2/1962 | Kalmus et al. | 324/83 |
| 3,181,116 | 4/1965 | Gordon | 340/5 T |
| 3,469,231 | 9/1969 | Geiling et al. | 340/6 R |

*Primary Examiner*—Richard A. Farley
*Attorney*—S. C. Yeaton

[57] ABSTRACT

An acoustical apparatus for divers including an underwater omni-directional transmitter and a three-section receiver having two hydrophones and two earpieces mounted on head gear worn by each diver. Pulse signals from the transmitter are sensed by the hydrophones disposed in a signal conditioning section of the receiver and are coupled through preamplifiers and detection circuits to bistable multivibrators in a signal processing section of the receiver. This latter section includes a pair of microcircuit pulse generators and a counter for determining the relative occurrence of the pulses and the time separation between the pulses. A third section of the receiver is comprised of monostable multivibrators, logic gates, attenuation circuits and bone conduction earpieces as output elements. This third section is responsive to the output signals of the processing section and enables the diver to perceive the direction of the underwater transmitter.

10 Claims, 6 Drawing Figures

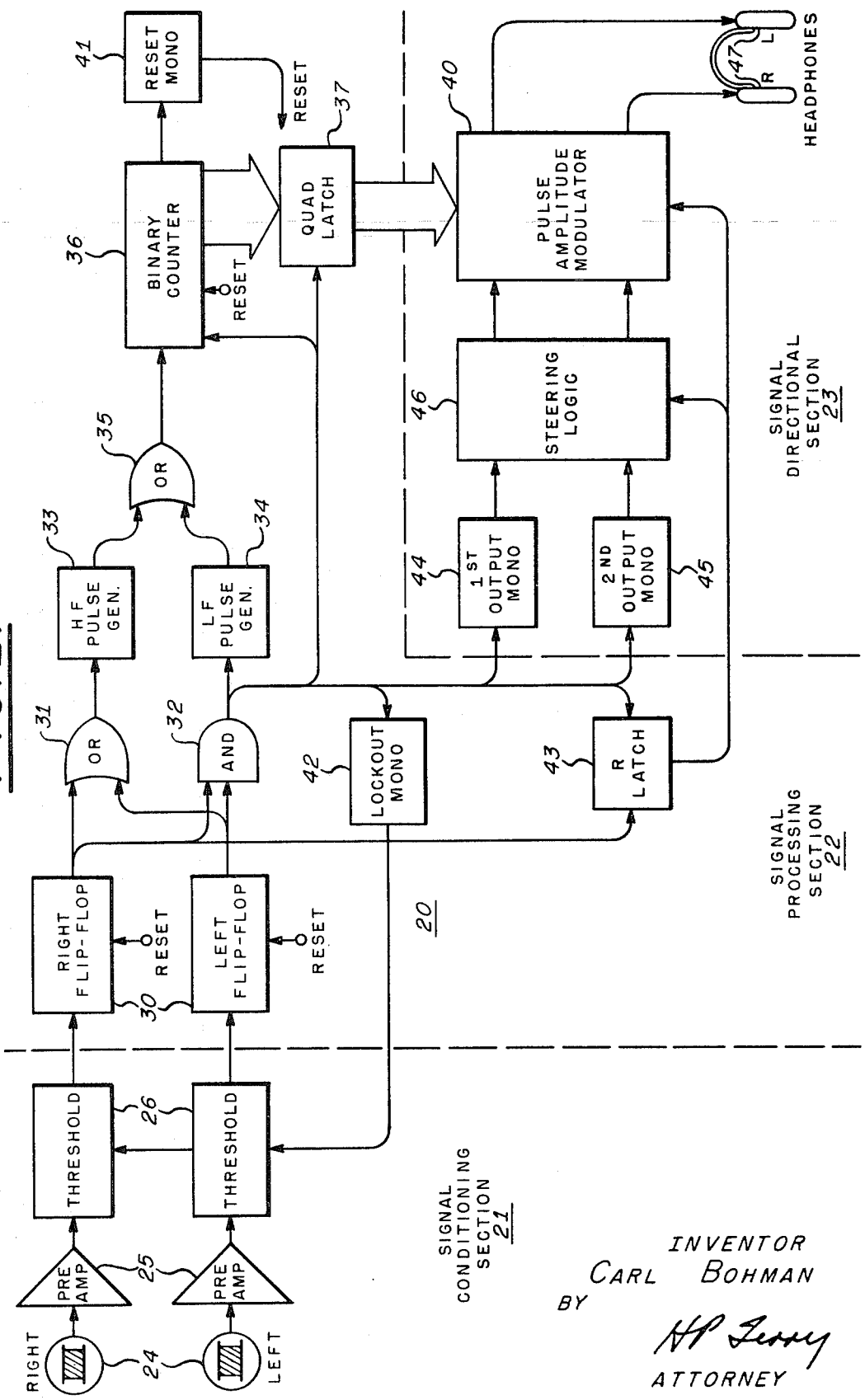

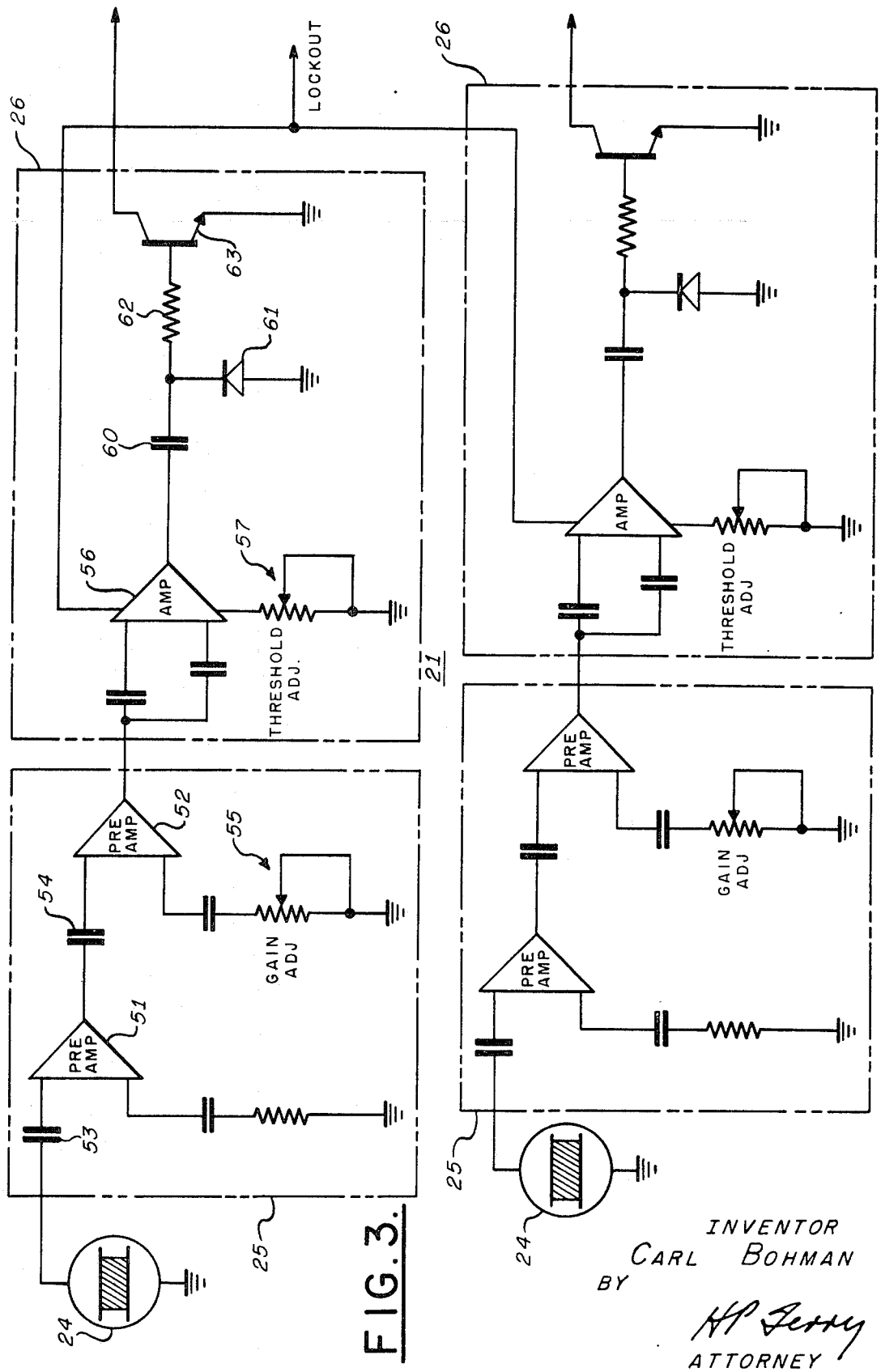

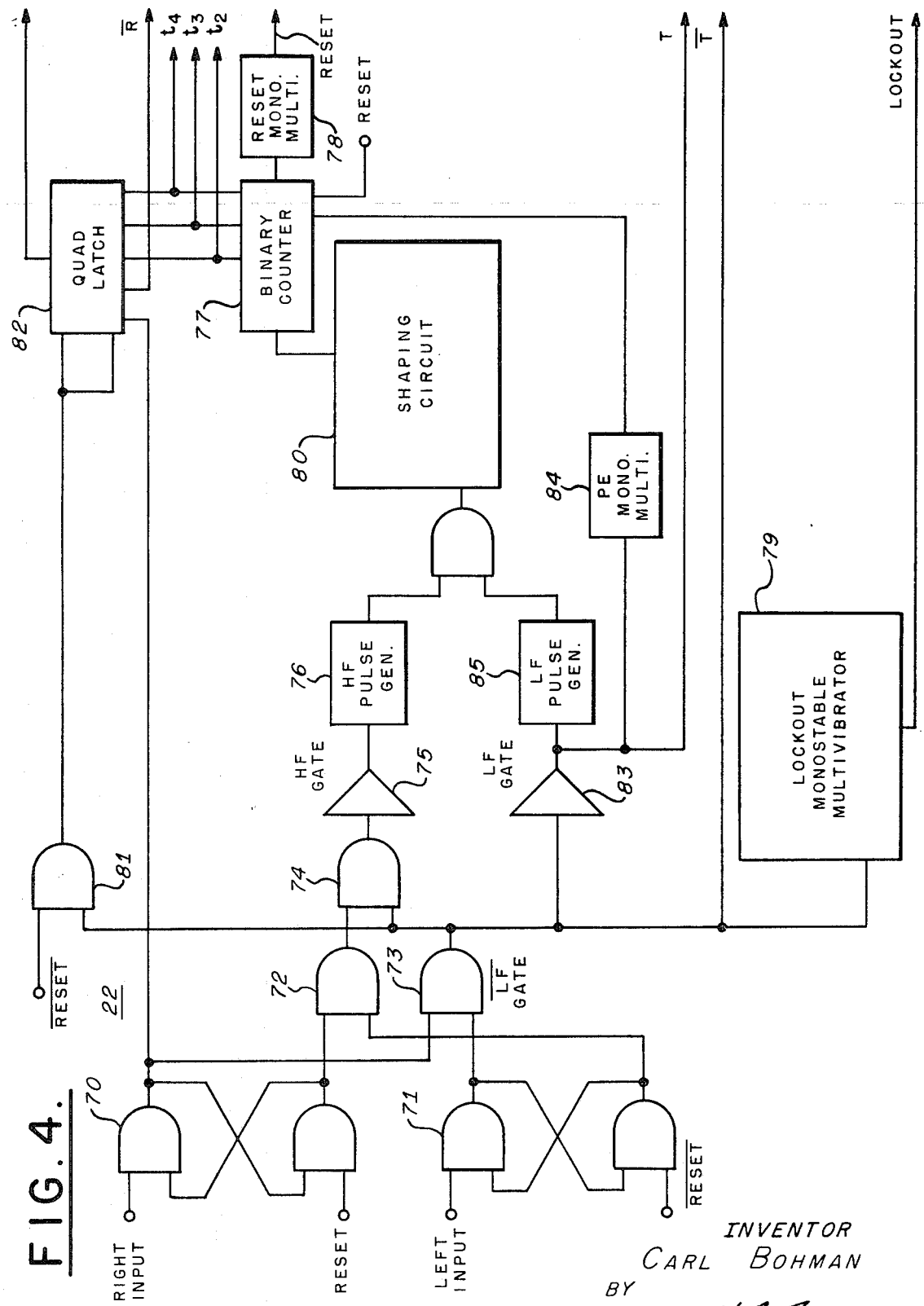

UNDERWATER LOCALIZATION SYSTEM

BACKGROUND OF THE INVENTION

1. Field of the Invention

The subject invention pertains to the art of communication systems especially to pulse modulated systems used in an underwater environment to enable divers to locate the source of an underwater beacon signal.

2. Description of the Prior Art

Recent exercises in undersea rescue, salvage, mining and oil explorations and research have underlined the importance of placing work teams of men underwater. However, the underwater environment decreases the efficiency of the men in performing these exercises. Although a great many advances have been made toward bettering the divers environment such as heated suits to offset reduced temperatures, improved breathing apparatus and the development of special tools and techniques, the problem of diver disorientation requires further solution. Presently, it is common practice for divers engaged in hazardous activities or operating under poor visibility conditions to use a safety line as a link to fellow divers or as a return guide to a known reference point such as a boat or underwater installation. Rescue operation experiments have also been conducted in which a trained porpoise has been used to rescue a disoriented diver. In saturation diving where the diver operates from an underwater habitat, the ability of the diver to locate the habitat is of crucial importance since surfacing might cause severe consequences and possibly even result in the death of the diver. Further applications of underwater localization systems, in addition to those regarding the safety of the diver include relocating underwater installations such as pipelines, cables and shellfish beds.

In state of the art localizing systems, divers generally use a hand held directional sonar receiver to locate an acoustical transmitter or pinger. In operation, the diver manually scans with the receiver until the direction of the loudest reception is indicated either by headphones or a signal strength meter. This system does not make use of the diver's innate ability to perceive the direction of the transmitter using his own aural faculties. Rather, the direction of the sound is determined by the highly directional receiver which the diver must manipulate until the meter or headphone provide the indication of loudest reception. The diver then moves toward the signal source keeping the receiver trained in the direction giving the loudest reception. Handling the receiver further encumbers the diver who is already burdened with monitoring his life support systems and with tools to perform his intended task.

A problem attendant with using the diver's own aural faculty to determine the direction of sound in water is that sound velocity in water is approximately 4.3 times greater than in air thereby creating the illusion that the distance between the diver's ears is reduced. The resultant effect on the diver is that his normal localization process is thwarted giving rise to the sensation that the sound from a single source is coming from every direction. It has been successfully demonstrated that increasing the spacing between hydrophones and binural headphones to equalize the increased velocity of sound in water restores the direction perception of the diver.

SUMMARY OF THE INVENTION

The subject invention is an underwater localizing system for divers utilizing an inaudible supersonic emission signal from a transmitter as an acoustic beacon. Pulse modulation is impressed on the signal to enable one or more receivers located within the service area of the transmitter to ascertain the direction of the transmitter. Right and left hydrophones affixed to a diver's head in the vicinity of his ears sense the inaudible signal and produce right and left electrical signals. These electrical signals are coupled to a back mounted receiver unit that is divided into three distinct sections.

The first section is the signal conditioning section and contains parallel preamplifiers and filters at the input of the unit to provide amplification and bandwidth control of the right and left electrical signals received from the hydrophones. Threshold detectors having input levels set slightly higher than the background noise level respond to the output signals from the filters.

Signals exceeding the threshold levels are coupled into the second section referred to as the signal processing section where they are applied to parallel bistable multivibrators. Logic circuits connected to the bistable multivibrators determine whether the right or left electrical signals were received first and the time separation between these signals.

Digital signals indicative of the left, right sequence are applied to two identical monostable multivibrators in the directional synthesis section of the receiver. The first output pulse from the monostable multivibrators is coupled to the corresponding bone conducting earpiece at full amplitude and the subsequent pulse is attenuated in proportion to the time separation between the signals. The time separation between the signals applied to the earpieces simulates the natural separation the diver would experience listening to the sound in air. Therefore, by using his aural faculties and normal head movements, he is able to locate the direction of the underwater transmitter.

BRIEF DESCRIPTION OF THE DRAWINGS

FIG. 2 is a block diagram of the receiver used in the present invention;

FIG. 3 is a schematic diagram of the signal conditioning section of the receiver;

FIG. 4 is a schematic diagram of the processing section of the receiver;

DESCRIPTION OF THE PREFERRED EMBODIMENT

Figure 1:
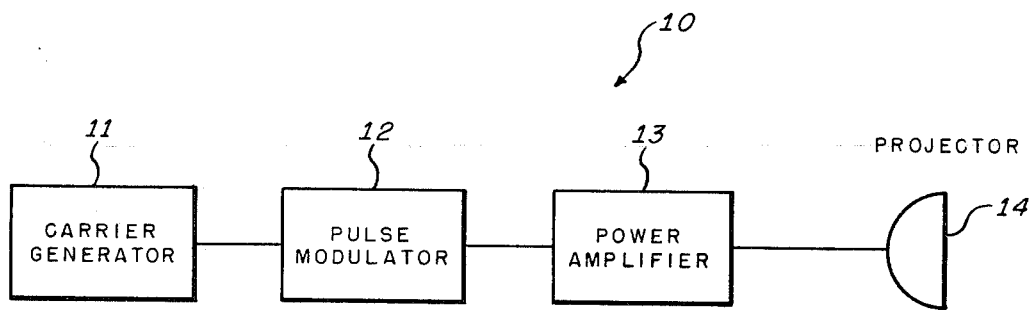
FIG. 1 is a block diagram of the transmitter used in the present invention.

The subject invention will be described with respect to the drawings. In FIG. 1, a transmitter 10 includes a carrier generator 11 which generates a supersonic carrier signal that is connected to a pulse modulator 12. To obtain optimum pulse repetition rate or click rate for effective binural direction perception, the rate produced by the pulse modulator 12 should be above 5 Hz. The pulse duration is dependent on the bandwidth which is a function of binural hearing in air and water.

It can be shown that a person hearing a sound in air, in order to perceive its direction in azimuth to 10°, the ears must resolve a time differential to within 83 microseconds. Since sound in water travels approximately 4.3 times faster than in air, this requires that a person hearing a sound underwater in order to perceive its direction in azimuth to 10°, the ears would have to resolve a time differential to 19 microseconds. Therefore, in order to synthesize 10° azimuth in the binural outputs, the underwater localizing system must resolve signal arrivals to within 19 microseconds. It follows that the input bandwidth of the receiver must be 4.3 times greater than the output bandwidth in order to present a resolvable time differential of 83 microseconds to the diver.

FIG. 2 shows a block diagram of the receiver 20 which is divided into a signal conditioning section 21, a signal processing section 22 and a signal directional section 23. In the signal conditioning section 21, supersonic signals transmitted by the transmitter 10 of FIG. 1 are sensed by left and right hydrophones 24. Each of the hydrophones 24 is connected to a corresponding preamplifier in a preamplifier section 25 and coupled to a threshold detector 26. The signal processing section 22 has left and right bistable multivibrators 30 connected to the output of threshold detectors 26. Each output of the multivibrators 30 is connected to an OR circuit 31 and an AND circuit 32. The output of the OR circuit 31 is applied to a high frequency pulse generator 33 and the output of the AND circuit 32 is applied to a low frequency pulse generator 34.

An OR circuit 35 is connected to the outputs of the pulse generators 33 and 34 and provides an output signal that is applied to a binary counter 36. The count output of binary counter 36 is coupled through latch circuit 37 into a pulse amplitude modulator 40 in the signal directional section 23. The binary counter 36 also provides an output pulse signal to a reset monostable multivibrator 41 which provides a reset pulse to the binary counter 36 and the right and left bistable multivibrators 30. The AND gate 32 output is also connected to the binary counter 36, the latch circuit 37, a lock-out monostable multivibrator 42, and a right latch circuit 43, all located in the signal processing section 22. In addition, the AND circuit 32 output is connected into a first output monostable multivibrator 44 and a second output monostable multivibrator 45 in the signal directional section 23. A steering logic circuit 46 receives signals from the first and second output monostable multivibrators 44 and 45 and a steering control signal from the right latch circuit 43. The pulse amplitude modulator 40 applies analog signals to right and left headphones 47 which couple audible signals to the diver's head. The right latch circuit 43 and the steering logic circuit 46 provide control signals to the pulse amplitude modulator 40.

The operation of the signal conditioning section 21 will be described with reference to FIG. 3. The signal conditioning section 21 operates on the signals from the two hydrophones 24 independently. Each signal is preamplified and filtered to accommodate a 10 KHz bandwidth in the preamplifier section 25. Since each channel is identical in the signal conditioning section 21, only one channel will be described in detail.

Two integrated circuit amplifiers 51 and 52 are employed as cascaded signal amplifiers in each channel. A fixed gain is produced by the input preamplifier 51 followed by a variable gain in the preamplifier 52 as controlled by a gain adjustment potentiometer 55. Amplifier gains are adjusted for equal outputs in each channel with only background noise as an input. Coarse 15 KHz high pass filters are effected by the coupling capacitors 53 and 54 and the nominal input resistance of preamplifiers 51 and 52. A bandpass filter is effected by simultaneously high pass coupling into the inverting and non-inverting inputs of the amplifier 56. The amplifier 56 is configured for squelch operation without hysteresis. A threshold adjustment potentiometer 57 sets the squelch threshold such that no output occurs for background noise levels.

Upon receipt of proper electrical signals from the preamplifier section 25, the threshold is exceeded and a substantial output appears. A diode voltage doubler circuit comprised of capacitor 60, diode 61 and resistor 62 detects the output from the amplifier 56 and applies the detected output to the transistor 63. A lock-out feature of the amplifier 56 is employed which inhibits the amplifier 56 upon receipt of a logic signal command from the processing section 22.

The signal processing section 22 performs two functions which will be described with reference to FIG. 4. Positive logic is used throughout, therefore, logic TRUE is represented by a high voltage and logic FALSE is represented by a low voltage. First, it determines whether the supersonic signal received from the transmitter 10 is received first by the right or left hydrophone 24 and then it measures the time separation between the signals sensed by the hydrophones 24. In this step, a determination is made as to whether an acceptable signal was received. The criterion of acceptability is based on a maximum allowable pulse separation $t$ of 150 microseconds. If $t \geq$ than 150 microseconds, the processing operation is terminated and no outputs are generated. If $t$ is less than 150 microseconds, its magnitude is measured and stored and the first step of the processing operation is concluded.

In the second step, four outputs are generated by the processing circuits. These outputs are the identity of the signal received first (R or $\overline{R}$), the magnitude of the measured time displacement $t$, between the sensed signals, a pulse duration of T which is equal to 4.3 $t$, and a lock-out pulse approximately 90 milliseconds in duration.

The two outputs received from the right and left channels of the signal conditioning section 21 shown in FIG. 3 are applied to the right and left bistable multivibrators 70 and 71. The input sequence may be either right before left or left before right. In the case of a right-before-left sequence, the bistable multivibrator 70 is set by the initial (right) input going from a high voltage to a low voltage and being coupled through AND gates 72 and 74 to HF gate 75. The HF gate 75 output is changed from a low voltage to a high voltage to become a logic TRUE. An HF pulse generator 76 is thereby enabled and produces a stream of pulses which are accumulated in the four step binary counter 77. A shaping circuit 80 broadens the pulses to insure a reliable count. The HF gate 75 remains as logic TRUE and the counting continues until the subsequent (left) input sets the bistable multivibrator 71 by going from a high voltage to a low voltage. The output from the bistable multivibrator 71 is coupled through $\overline{LF}$ gate 73 and into gate 74 thereby inhibiting the HF pulse generator 76 and an accumulated count, n, which is proportional to $t$, the time separation of inputs, remains in the counter.

In the case of a left-before-right input sequence, circuit operations are identical with the case of a right-before-left input sequence except that the initial (left) input sets bistable monostable multivibrator 71 and the HF gate 75 via gates 72 and 74 becomes a logic TRUE, enabling the HF pulse generator 76; the subsequent (right) input sets the bistable multivibrator 70 and the HF gate 75 via gates 73 and 74 becomes a logic FALSE, thereby inhibiting the HF pulse generator 76.

In the event that the binary counter 77 reaches its terminal state which corresponds to a count of 15 prior to the occurrence of the subsequent input, the counter 77 generates a TC output that triggers a reset monostable multivibrator 78 which generates a $\overline{RESET}$ output that is applied to the right and left bistable multivibrators 70 and 71 and the counter 77. The pulse repetition rate, prr, of the HF pulse generator 76 is set at 100 KHz in order that the terminal state of the counter 77 will be reached in 150 microseconds which is the maximum allowable time separation.

Several additional operations take place when the subsequent input goes from a high voltage to a low voltage. First, the $\overline{LF}$ gate 73 output becomes a logic FALSE and is coupled through gate 81 triggering a quad latch circuit 82 which stores the prior state of the right bistable multivibrator 70 as well as the three most significant digits of the count $n$. Second, when the $\overline{LF}$ gate 73 becomes a logic FALSE, it sets the lock-out monostable multivibrator 79. Third, the LF gate 83 which is coupled to the output of the $\overline{LF}$ gate 73 becomes a logic TRUE triggering a PE monostable multivibrator 84. A parallel entry pulse is thereby generated causing the number, $n$, in the counter to be complemented. The inversion for complementing is obtained from the quad latch circuit 82 and an inverter circuit (not shown). Fourth, the LF gate 83 enables the LF pulse generator 85 which generates a stream of pulses that are coupled into the binary counter 77.

Starting from a count of $\overline{n}$, the counter will reach its terminal state in exactly $n$ pulses. As described above, the TC output from the counter 77 then triggers the reset monostable multivibrator 78 and the $\overline{RESET}$ output is applied to the bistable multivibrators 70 and 71 and the counter 77.

The T pulse which is equal to 4.3 $t$ is obtained by setting the prr of the LF pulse generator 85 at 1/4.3 of the prr of the HF pulse generator 76 or 23.3 KHz. Thus, the second count of $n$ pulses will require 4.3 times longer to complete than the first count. Since the LF gate 83 controls the LF pulse generator 85, the duration of its logic TRUE state is T. At the conclusion of these operations, T has been generated, the right-left sense of the input is available in the quad latch circuit 82 as is the magnitude of $t$.

If only one input had been received or if the separation of the two inputs received had exceeded 150 microseconds, the T pulse would not have been generated and all the circuits would have been reset to their initial state. In such event, the lock-out monostable multivibrator 79 would not have been set. The function of the lock-out monostable multivibrator 79 is to inhibit the amplifiers 56 in the signal conditioning circuit 21 whenever an acceptable pair of input signals is received. A pulse duration of 90 milliseconds is generated by the lock-out monostable multivibrator 79 to hold the amplifiers 56 in their off state until reception of subsequent signals is expected. In this manner, the likelihood of a false alarm is decreased as the receiver 20 is more closely matched to the pulse rate of the transmitter 10.

An alternate embodiment, not shown, includes a lock-out monostable multivibrator 79 having an adjustable pulse duration. The receiver can then be made to match various transmitting pulse rates. In this alternative embodiment, a configuration is effected in which a plurality of transmitters are operated simultaneously but at different pulse rates. A receiver is able to lock-on to any one of the transmitters by properly selecting the applicable pulse duration of the lock-out monostable multivibrator 79.

Figure 5:
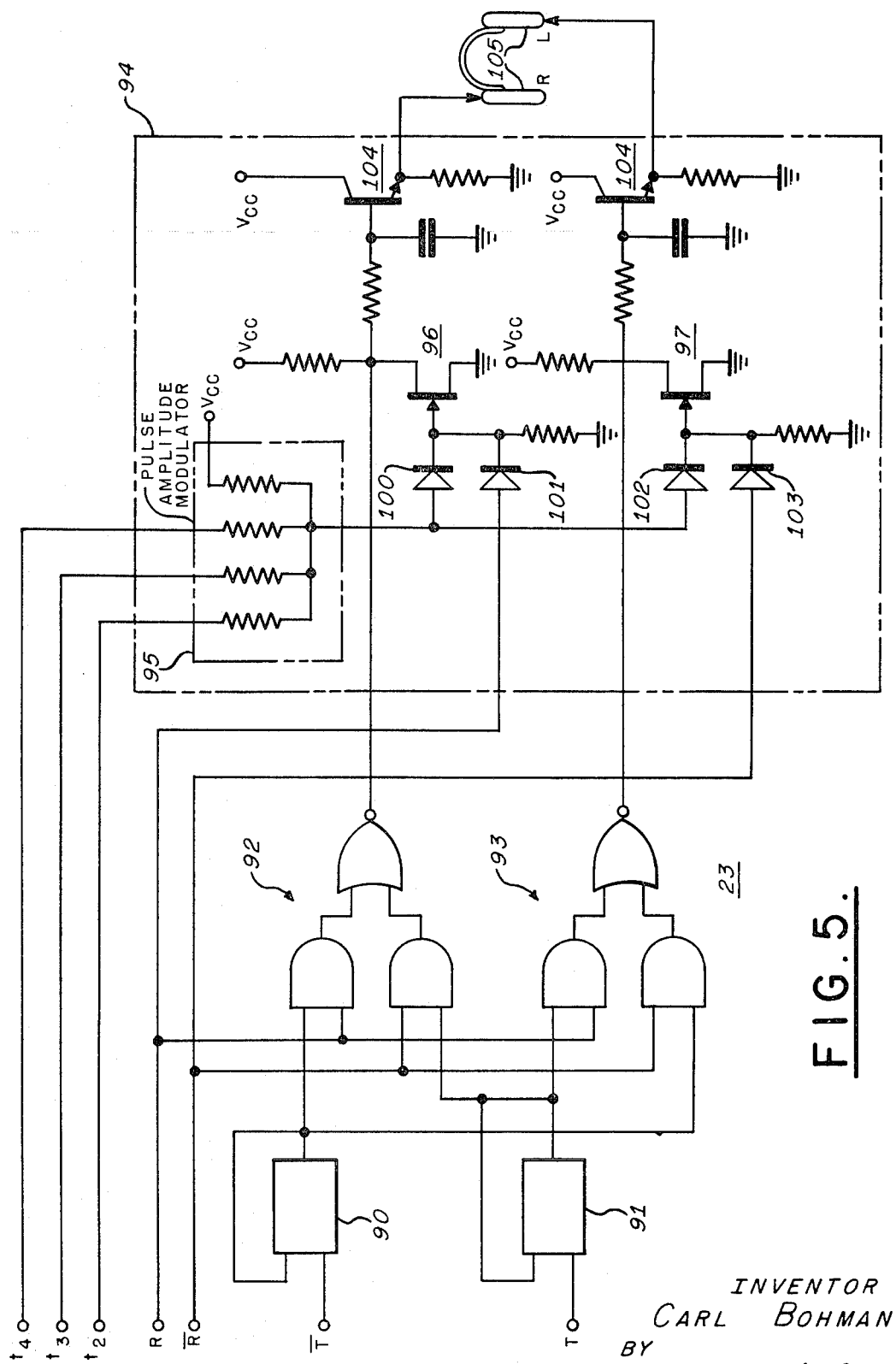
FIG. 5 is a schematic diagram of the directional synthesis section of the receiver.

The signal directional section 23 will be described with respect to FIG. 5. Three sets of data received from the signal processing section 22 are used to derive the directional outputs at the headphones 105. These three sets of data are first the right-left sense inputs, R, $\overline{R}$, second the timing pulses T and $\overline{T}$, and third, the three most significant digits of the count n, i.e., $t_2$, $t_3$ and $t_4$.

Two identical input monostable multivibrators 90 and 91 each generate pulses of 100 microseconds duration. The input monostable multivibrator 90 operates at the beginning of the interval T while the input monostable multivibrator 91 operates at the end of this interval. Dual AND gates 92 and 93 steer the pulses generated by the monostable multivibrators 90 and 91 in accordance with the state of the right-left sense input R. These pulses are coupled to an output driver 94 which is shown schematically in dashed lines. Digital-to-analog conversion is performed on the $t$ inputs in the pulse amplitude modulator 95 to obtain a voltage level which is proportional to the value of $t$. This voltage level is applied to field effect transistors 96 and 97 in each channel which function to attenuate the pulse amplitude in each channel. Diodes 100, 101, 102 and 103 comprise OR logic circuits which are used to override the pulse amplitude modulator 95 for the channel with the first pulse according to the sense inputs R. Thus, the first pulse is always presented at full amplitude and the second pulse is attenuated in proportion to $t$.

The output pulses from the dual AND gates 92 and 93 are coupled through identical emitter-followers 104 in each channel to the headphones 105 in which bone conduction earpieces used as output elements are coupled to the diver's head in the vicinity of his ears.

Figure 6:
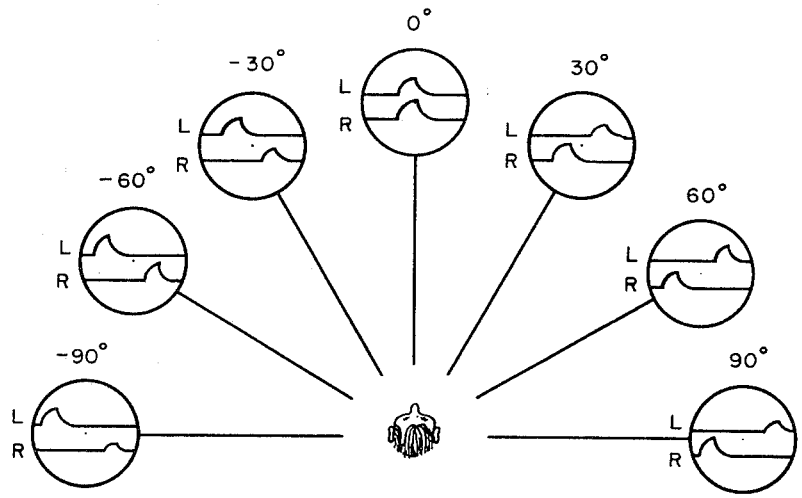
FIG. 6 is a sketch of the synthetic binural receiver outputs which represent the relative amplitude and time separation of signals received from a pulse transmitter positioned at various angles with respect to a diver.

FIG. 6 is a sketch which shows the relative amplitudes and time separation of the audible signals coupled to the diver's head through the headphones 105 for seven different angular positions of the transmitter 10. When the transmitter 10 is directly in line with the orientation of the diver's head, 0°, both left and right audible signals are at maximum amplitude and time coincident. As the position of the transmitter 10 is moved to the right, the right audible signal remains at its maximum amplitude but occurs earlier in time, while the left audible signal is reduced in amplitude and occurs later in time. The same effect occurs if the transmitter 10 is moved to the left from the 0° position except the left audible signal amplitude remains at its maximum amplitude and occurs earlier in time, while the right audible signal amplitude is reduced and occurs later. The relative amplitudes and occurrence of these audible signals duplicate the sensation of sound the diver would experience in air, thereby enabling him to determine the direction of the transmitter 10.

While the invention has been described in its preferred embodiment, it is to be understood that the words which have been used are words of description rather than limitation and that changes may be made without departing from the true scope and spirit of the invention in its broader aspects.

I claim:

1. An underwater localization system for divers comprising transmitter means for providing supersonic pulse modulated signals, and receiver means adapted to receive said signals including transducer means affixed to each diver having right and left spaced hydrophones for producing first and second time displaced electrical signals in response to a received pulse modulated signal, means coupled to said transducer means for providing digital output signals indicative of the sequence in which said pulse modulated signal arrived at said right and left hydrophones, means responsive to said digital output signals for measuring the time difference between the arrival of said pulse modulated signal at said right and left hydrophones, means coupled to said measuring means for converting said time difference for a supersonic pulse modulated signal travelling in water to a time difference for an identical signal travelling in air, and means coupled to said measuring means, said converting means and responsive to said digital output signals for producing audible analog signals which are coupled into each diver's head in the vicinity of his ears enabling him to use his oral direction perception ability to locate said transmitter means.

2. An underwater receiver for divers responsive to transmitted supersonic pulsed modulated signals comprising transducer means having right and left spaced hydrophones for producing first and second time displaced electrical analog signals in response to a received pulse modulated signal, means coupled to said transducer means and responsive to said electrical analog signals for providing digital output signals indicative of the sequence in which said received pulse modulated signal arrived at said right and left hydrophones, means responsive to said digital output signals for measuring the time difference between the arrival of said pulse modulated signal at said right and left hydrophones, means coupled to said measuring means for converting said time difference for a pulse modulated signal travelling in water to a time difference for a pulse modulated signal travelling in air, and means coupled to said measuring means, said converting means and responsive to said digital output signal for transforming said digital output signals into audible directional signals which enable each diver to determine the direction from which said pulse modulated signal originated by using his innate oral direction perception faculties.

3. An underwater receiver as recited in claim 2 in which said transducer means includes preamplifiers and filter circuits, and said means for producing audible analog signals includes amplifiers and emitter-follower circuits wherein said transducer means has a bandwidth 4.3 times greater than said means for producing audible analog signals.

4. An underwater receiver as described in claim 2 in which said transducer means includes serially connected preamplifier circuits and threshold circuits for controlling the input bandwidth of said receiver thereby eliminating background noise from said first and second electrical signals.

5. An underwater receiver as recited in claim 2 in which said time difference measuring means includes logic circuits which provide an output signal for inhibiting said transducer means when said measured time difference is below a preset threshold.

6. An underwater receiver as recited in claim 2 in which said means for providing digital output signals includes a first bistable multivibrator coupled to said right hydrophone and a second bistable multivibrator coupled to said left hydrophone.

7. An underwater receiver as recited in claim 6 in which said means for measuring said time difference includes a binary counter coupled to said first and second bistable multivibrators.

8. An underwater receiver as recited in claim 2 in which said time difference converting means includes logic circuits for providing a pulse having a width 4.3 times greater than the measured time difference between the arrival of said pulse modulated signal at said right and left hydrophones.

9. An underwater receiver as recited in claim 2 in which said means for producing audible analog signals includes right and left bone conducting earpieces mounted on headgear worn by said divers for coupling said audible analog signals into each diver's head.

10. An underwater receiver as recited in claim 2 in which said means for producing audible analog signals includes left and right transducers coupled to serially connected amplifiers and emitter-followers in which right and left analog signals are transformed into right and left audible signals having amplitudes in accordance with the time difference between the arrival of said pulse modulated signal at said right and left hydrophones respectively.

* * * * *